UNITED STATES PATENT OFFICE.

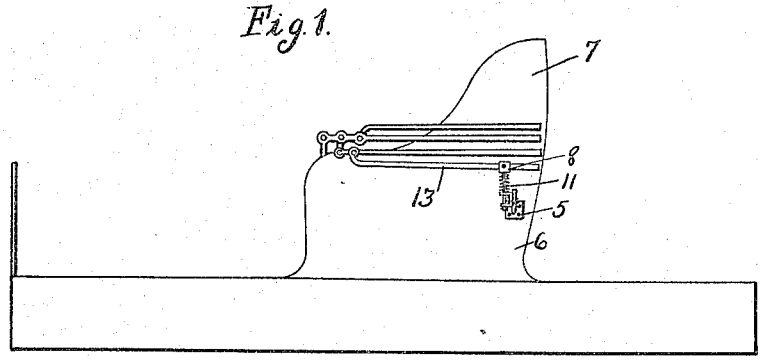

EDWIN A. UNVERZAGT, OF BRIGHTON, ILLINOIS.

VEHICLE-TOP SUPPORT.

1,282,658.

Specification of Letters Patent.

Patented Oct. 22, 1918.

Application filed January 12, 1917. Serial No. 142,014.

*To all whom it may concern:*

Be it known that I, EDWIN A. UNVERZAGT, a citizen of the United States, residing at Brighton, in the county of Macoupin and State of Illinois, have invented certain new and useful Improvements in Vehicle-Top Supports, of which the following is a specification.

This invention relates to vehicle top supports, and more particularly to means for supporting the foldable top of a buggy, automobile, or similar vehicle.

One of the main objects of the invention is to provide resilient means for engaging the side bars of a vehicle top so as to support the same when the top is folded down, thus preventing unnecessary jarring of the top frame.

A further object is to provide a device of the character stated, of simple construction and operation which may be adjusted vertically so as to support the top frame at the desired inclination.

A still further object is to provide a device which may be applied to a vehicle of standard construction and which may be produced at a relatively low cost.

Further objects will appear from the detail description:

In the drawings:

Figure 1 is a side view of a vehicle body with the device applied,

Fig. 2 is a side view of the support,

Fig. 3 is a front view of the same.

A U-bracket 1 is secured by means of a plate 2 and U-clips 3 on the vertical arm $4^a$ of a rectangular supporting rod 4 which is secured by means of a base-plate 5 to the body 6 of the vehicle seat 7. By loosening the U-clips 3, the bracket 1 may be secured in any desired vertical adjustment on rod 4, thus lowering or varying the effective height of the support as desired. When the U-clips 3 are loosened, the bracket 1 may also be adjusted about the vertical arm $4^a$ of the supporting arm 4 thus permitting the bracket to be moved toward or away from the side of a vehicle body to accord with the distance of the frame bars to be supported from the body of the vehicle.

The upper arm $1^a$ of bracket 1 is provided adjacent its outer end with a vertically disposed aperture which is in vertical alinement with a similar aperture adjacent the outer end of the lower arm $1^b$. A rod 7 is slidably mounted through the arms $1^a$ and $1^b$ and is provided at its upper end with a rectangular head $7^a$. A U-frame 8 is mounted on rod 7 at the upper end thereof, and is provided with a suitable lining or pad 9 of rubber, or other suitable material, riveted therein as at 10. An expansion coil-spring 11 is mounted about rod 7 and is confined between arm $1^a$ of bracket 1 and the U-frame 8. This spring acts to normally hold the rod and consequently the head carried thereby and frame in raised position.

The spring 11 also acts to hold the U-frame 8 in frictional engagement with the head $7^a$ of rod 7 so as to secure this frame in rotary adjustment of the rod, while permitting it to be turned about the rod manually, as will be clear from Fig. 3 of the drawings. The rod extends slightly below the lower arm $1^b$ of the bracket and is apertured to receive a cotter-pin 12. This pin acts to positively limit the upward movement of the rod and thus prevent entire withdrawal of the same from the bracket.

The U-frame 8 is adapted to receive the lowermost side bar 13 of the side bars of the top frame. By this means, the top frame is supported, the coil-spring 11 providing a resilient mounting which acts to absorb violent shocks which would otherwise be imparted to the top frame, thus preventing injury to the frame due to these shocks. By adjusting the bracket 1 vertically, the supporting frame 8 can be brought into such position as to support the side frame bars at such an angle as to render the support highly efficient. In practice, two of these supports will be utilized, one being mounted at each side of the seat, thus providing a resilient support for each side of the top frame.

What I claim is:

In a device of the character described, a supporting rod, a bracket secured on said rod for adjustment about the same so as to permit said bracket to be adjusted toward and away from a vehicle body to which said supporting rod is secured, a rod slidable vertically in said bracket, said rod being provided at its upper end with a supporting frame adapted to receive the bars of a vehicle top frame, and an expansion coil spring mounted about the rod intermediate said supporting frame and the bracket for holding the rod in raised position.

In testimony whereof I affix my signature in presence of two witnesses.

EDWIN A. UNVERZAGT.

Witnesses:
THOS. F. CHAMBERLAIN,
NORMAN O. EDDINGTON.